United States Patent [19]
Van Dine et al.

[11] Patent Number: 6,120,923
[45] Date of Patent: Sep. 19, 2000

[54] STEAM PRODUCING HYDROCARBON FUELED POWER PLANT EMPLOYING A PEM FUEL CELL

[75] Inventors: Leslie L. Van Dine, Manchester; Leonard J. Bonville, Marlborough, both of Conn.

[73] Assignee: International Fuel Cells, LLC, South Windsor, Conn.

[21] Appl. No.: 09/221,292

[22] Filed: Dec. 23, 1998

[51] Int. Cl.[7] .................................................. H01M 8/06
[52] U.S. Cl. .............................. 429/17; 429/19; 429/20; 429/26
[58] Field of Search ................. 429/12, 13, 17, 429/19, 20, 26

[56] References Cited

U.S. PATENT DOCUMENTS

| | | | |
|---|---|---|---|
| 4,098,587 | 7/1978 | Krar et al. ................................ | 48/94 |
| 4,098,588 | 7/1978 | Buswell et al. ........................... | 48/94 |
| 4,344,850 | 8/1982 | Grasso .................................... | 210/664 |
| 4,824,740 | 4/1989 | Abrams et al. .......................... | 429/24 |
| 5,023,151 | 6/1991 | Landau et al. ........................... | 429/24 |
| 5,330,727 | 7/1994 | Trocciola et al. ....................... | 422/177 |
| 5,344,721 | 9/1994 | Sonai et al. .. | |
| 5,503,944 | 4/1996 | Meyer et al. ............................ | 429/13 |
| 5,565,279 | 10/1996 | Fredley et al. .......................... | 429/26 |
| 5,573,866 | 11/1996 | Van Dine et al. ....................... | 429/13 |
| 5,700,595 | 12/1997 | Reiser ..................................... | 429/13 |

FOREIGN PATENT DOCUMENTS 5-275101  10/1993  Japan .

Primary Examiner—Maria Nuzzolillo
Assistant Examiner—Susy Tsang
Attorney, Agent, or Firm—Brian D. Lefort

[57] ABSTRACT

The present invention relates to a method and apparatus for creating steam from the cooling stream of a proton exchange membrane (PEM) fuel cell. As the cooling stream exits the PEM fuel cell, a portion of the cooling fluid is extracted from the circulating cooling stream, thereby creating a secondary stream of cooling fluid. This secondary stream passes through a restriction, which decreases the pressure of the secondary stream to its saturation pressure, such that when the secondary stream enters a flash evaporator it transforms into steam. Creating steam from the cooling stream of a PEM fuel cell power plant provides the fuel processor with a co-generated source of steam without adding a significant amount of auxiliary equipment to the power plant.

20 Claims, 3 Drawing Sheets

STEAM PRODUCING HYDROCARBON FUELED POWER PLANT EMPLOYING A PEM FUEL CELL

TECHNICAL FIELD

This invention relates to a fuel cell power plant and more particularly to a power plant employing a proton exchange membrane fuel cell.

BACKGROUND

Many industrial facilities utilize fuel cell power plants to satisfy both their daily and temporary need for electricity. The fuel cell itself consists of an anode, a cathode and an electrolyte that separates the two. Fuel reactant gas, which is typically a hydrogen rich stream, enters the anode of the fuel cell and oxidant reactant gas, which is commonly air, enters the cathode of the fuel cell. A catalyst in the anode causes the hydrogen to oxidize resulting in the creation of hydrogen ions, which pass through the electrolyte to the cathode, thereby creating an electric potential across the fuel cell.

There are various types of fuel cells, which vary according to their electrolyte. The electrolyte is the ionic conducting substance between the anode and the cathode. One type of fuel cell includes an acid electrolyte, such as phosphoric acid ($H_3PO_4$), typically operating at a temperature range of about 375° F. to about 425° F. Most fuel cells, therefore, include a cooler that allows coolant fluid, such as water, to circulate through the fuel cell in a re-circulation loop, thereby controlling the temperature of the fuel cell within a predetermined range. As the coolant fluid passes through the acid electrolyte fuel cell, however, the temperature of the coolant fluid increases to its saturation temperature such that a portion of the water begins to boil and transforms to its water vapor stage. At this point, the temperature of the coolant fluid remains relatively constant as additional water transforms to steam. By way of example, a typical phosphoric acid fuel cell cooling loop generates approximately 115 psia steam at a saturation temperature of about 338° F. This steam is thereafter separated from the liquid by a steam separator and utilized elsewhere within the fuel cell power plant. Namely the steam is utilized by a fuel processor or for other cogeneration processes that may require such a heat source. The fuel processor is a device that converts (i.e., reforms) a hydrocarbon fuel into a hydrogen rich stream, which is used by the anode.

Another type of electrolyte includes a membrane electrolyte, such as a solid polymer electrolyte or otherwise referred to as a proton exchange membrane (PEM). The solid polymers are commonly sulfonated fluorinated polymer membranes similar to those sold by E.I. dupont de Nemours and Company under the trademark NAFION. Fuel cells incorporating a solid polymer membrane or proton exchange membrane will hereinafter be referred to as a PEM fuel cell, which usually operate at a temperature range of about 140° F. to about 200° F. Such fuel cells typically operate in a pressure range of from about one atmosphere to about five atmospheres. The temperature and pressure of a PEM fuel cell are below the boiling point of water at about one atmosphere (i.e., ambient pressure), thereby preventing the coolant fluid from serving as a natural source of steam.

Although the phosphoric acid electrolyte fuel cell serves as a source of steam, its inclusion within a power plant increases the overall cost as compared to a PEM fuel cell because the power plant must include certain equipment and be constructed of materials capable of withstanding the operating environment, including the coolant pressure associated with a temperature range of about 375° F. to about 425° F. Furthermore, designing a system utilizing a phosphoric acid fuel cell, as compared to a PEM fuel cell, yields a lower actual power output for the power plant because the PEM fuel cell has higher performance characteristics. It is desirable, therefore, to design a fuel cell power plant by replacing the acid electrolyte fuel cell with a PEM fuel cell, thereby reducing the overall material and assembly costs associated with construction of such a power plant as well as eliminating compliance with the ASME pressure vessel codes.

The PEM fuel cell, however, does not operate at a temperature sufficient to cause the coolant fluid to boil and transform to steam, which is needed by the fuel processor to convert the hydrocarbon fuel to a hydrogen rich fuel stream. What is needed is an efficient method of converting the coolant stream of PEM fuel cell to steam.

DISCLOSURE OF INVENTION

Accordingly, the present invention relates to a method and apparatus for creating steam from the cooling stream of a PEM fuel cell. As the cooling stream exits the PEM fuel cell, a portion of the cooling fluid is extracted from the circulating cooling stream, thereby creating a secondary stream of cooling fluid that serves as a source of steam for the power plant. This secondary stream passes through a restriction, which decreases the pressure of the secondary stream to its boiling point. By transferring additional heat to the secondary stream, the secondary stream transforms into low pressure steam. One means for adding additional heat to the secondary stream includes incorporating a flash evaporator into the power plant. Upon receiving the cooling stream and the boiling water in the secondary stream, the flash evaporator transfers a portion of the heat in the cooling stream to the secondary stream such that the boiling water flashes to steam upon entering the flash evaporator. A means for increasing the pressure of the steam, such as a compressor, thereafter elevates the pressure of the steam and in doing so also increases the temperature of the steam.

Generating steam from the low temperature cooling stream of a PEM fuel cell power plant provides the fuel processor, located within the PEM fuel cell power plant, with a source of steam without adding auxiliary equipment, such as a boiler. Furthermore the amount of steam produced by the present invention can be greater than the steam required by the fuel processor. Thus, incorporating the present invention into a power plant comprising a PEM fuel cell allows the power plant to use the additional steam for other co-generation requirements.

The foregoing features and advantages of the present invention will become more apparent in light of the following detailed description of exemplary embodiments thereof as illustrated in the accompanying drawings.

BEST MODE CARRYING OUT THE INVENTION

Figure 1:
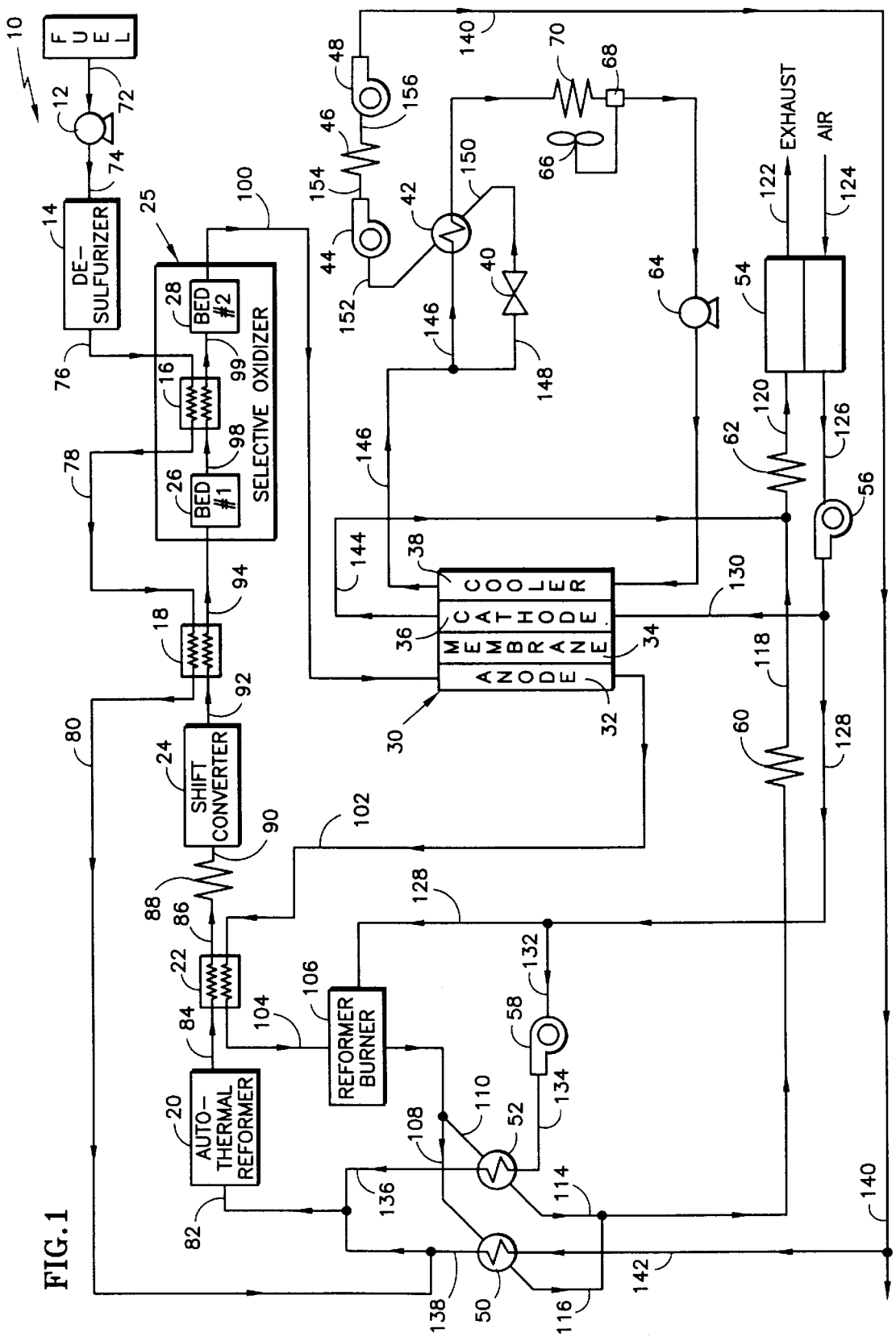
FIG. 1 is a schematic diagram of a power plant, which includes a coolant stream that circulates through a PEM fuel cell and produces steam for use by an autothermal reformer.

Referring to FIG. 1, there is shown a power plant 10 comprising a PEM fuel cell (hereinafter referred to as a "fuel cell") designated by the numeral 30, a means for cooling the fuel cell, a means for providing fuel reactant gas to the fuel cell, a means for providing oxidant reactant gas to the fuel cell and a means for producing steam from the cooling means. Although a power plant 10 typically consists of a plurality of fuel cells, which are collectively referred to as a cell stack assembly and connected electrically in series, for the purposes of simplicity in explaining the present invention, the block representing the fuel cell 30 illustrates only one fuel cell. Each fuel cell 30 includes a proton exchange membrane 34 disposed adjacent to and between an anode 32 and a cathode 36. As fuel reactant gas passes through the anode 32 and oxidant reactant gas passes through the cathode 36, hydrogen ions are produced that can pass through the proton exchange membrane 34 and create an electrical connection across the fuel cell 30 to complete the circuit when an external load is applied.

The electrochemical reaction, however, results in an increase in the temperature of the fuel cell 30, thereby necessitating a means for cooling the fuel cell 30. One such means includes a cooler 38, which is disposed on the side of the cathode 36 opposite of the anode 32, and a cooling loop, which is indicated generally by numeral 146. There are various types of coolers known in the art, but the cooling system for a PEM fuel cell has different requirements in comparison to an acid electrolyte fuel cell because the PEM fuel cell operates with the coolant stream interconnected to the reactant gases through a water filled porous graphite plate separating the reactant gas passages from the water coolant channels. These porous plates facilitate the addition or removal of water from the fuel cell. This results in the coolant system being an integrated part of the fuel cell water management system, thereby further complicating the parameters of the cooling means. Removing product water from the fuel cell in conjunction with passing cooling fluid through the fuel cell 30, which operates at about ambient pressure, requires careful control of the pressure in the cooling loop and of the oxidant reactant gas and of the reactant gas. An exemplary type of management system for cooling a PEM is described in commonly owned U.S. Pat. Nos. 5,503,944 and 5,700,595, which are both hereby incorporated by reference.

Coolant fluid such as water is circulated through the cooling loop 146 via a pump 64, which can be a fixed or variable speed pump. As the coolant fluid passes through the fuel cell 30, it absorbs heat. The coolant loop includes a heat exchanger 70 capable of reducing the temperature of the coolant fluid. Although this Figure illustrates a single pass heat exchanger, the system may include a dual pass heat exchanger. In one control option, a temperature sensor 68, such as a thermostat, senses the temperature of the cooling fluid exiting the heat exchanger 70 and delivers a signal to a fan 66, which passes air over the heat exchanger 70, thereby reducing the temperature of the coolant fluid returning to the fuel cell 30.

As the coolant fluid passes through the cooler 38, the temperature of the coolant fluid increases to a range of about 180° F. to about 200° F. and exits the cooler 38 at about ambient pressure (i.e., 14.7 psia). In order to create steam (i.e., water vapor) from the coolant fluid, a secondary stream (i.e., portion of main stream) of coolant fluid is extracted from the main coolant stream 146. At this point, the temperature of the secondary stream is equivalent to the temperature of the main coolant stream. The secondary stream is directed along line 148 to a valve 40 such as an expansion valve, thereby restricting the flow of coolant fluid. The valve 40, in conjunction with the downstream compressor 44, decreases the pressure of the secondary stream in line 150 to a pressure sufficient to cause the secondary stream to boil, while maintaining its temperature. The saturated water of the secondary stream in line 150, thereafter, enters a flash evaporator 42, which transfers the energy in the coolant fluid of the main coolant stream in line 146 to the secondary stream, thereby generating steam. For example, as 6874 lbs/hr of 180° F. water exits the cooler 38 along line 146 at about 14.7 psia, a secondary stream of 107 lbs/hr of water is created along line 148. The valve 40 reduces the pressure of the secondary stream in line 150 to about 4.7 psia, and as the secondary stream enters the flash evaporator 42, the water flashes to steam. The temperature and pressure of the steam exiting the flash evaporator 42 along line 152 are about 160° F. and 4.7 psia, respectively.

The steam exiting the flash evaporator 42 along line 152, thereafter enters a compressor 44 which increases the pressure and temperature of the steam. It is preferred that the compressor 44 increase the pressure of the steam to a level such that the difference between the pressure level and ambient pressure is greater than the pressure drop of the system that delivers the steam to the fuel processing system (discussed hereinafter). It is especially preferred that the compressor 44 further increase the temperature and pressure of the steam to a level such that the steam contains sufficient energy that can be used in applications additional to the requirements of the power plant 10. Depending upon the compressor's operating characteristics for pressurizing steam, it may be necessary to include a second compressor 48, thereby increasing the pressure of the steam in two stages rather than one. It may also be preferable to insert a heat exchanger 46 between the two compressors 44, 48 in order to extend the operating life of the compressor 48 and decrease the required pumping power. Specifically, inserting a heat exchanger between the two compressors reduces the temperature of the steam entering the second compressor 46 while maintaining its pressure. For example, as 107 lbs/hr of 160° F. steam enters the compressor 44 along line 152 at a pressure of about 4.7 psia, the compressor 44 increases the temperature and pressure of the steam to about 373° F. and 9.15 psia, respectively. This steam thereafter enters a heat exchanger 46 along line 154 and exits along line 156 at a temperature and pressure of about 221° F. and 9.15 psia. A second compressor 48 further increases the temperature and pressure of the steam to about 453° F. and 17.66 psia, respectively, which exits the second compressor 48 along line 140. A portion of the steam is directed along line 142 to the fuel processor 20 (discussed hereinafter) while the remainder is used for co-generation applications. Although the compressor 44 and second compressor 48 are driven by about 3.38 kW and 3.71 kW motors, respectively, this system produces about 4.4 BTU of high grade steam for every BTU of electricity used to operate the compressors. Therefore, it is possible to provide the user with an amount of steam exceeding the requirements of the fuel processor. This excess steam can, therefore, be used for other co-generation applications.

As mentioned above, the cathode 36 requires oxidant reactant gas, which may be essentially pure oxygen or air. FIG. 1 illustrates a means for supplying an oxidant reactant gas, comprised of air, to the cathode 36. This means starts by introducing incoming air to a water transfer device 54 along line 124. The water transfer device 54 is a device for transferring heat and water vapor that may be present in the combined power plant exhaust, to the incoming air supply. Although a water transfer device 54 is not necessary for operating the power plant 10, such a device is preferred because the water transfer device 54 allows the majority of water circulating through the power plant to be retained within the system. Maintaining the amount of water present within the power plant 10 reduces the need to furnish the power plant 10 with make-up water, thereby minimizing any potential problems associated therewith. Water transfer devices are known in the art and include such devices as contact condensers, contact saturators and enthalpy wheels as shown in FIG. 1. Conventional condensers could also be employed in the exhaust streams in order to extract water from the exhaust stream and return it to the gas stream, thereby maintaining water balance within the power plant. Therefore, as the power plant exhaust enters the water transfer device 54 along line 120 a portion of, the water molecules in the power plant exhaust transfer to the incoming air, thereby humidifying the air before exiting the water transfer device 54 along line 126. The portion of water molecules that does not transfer to the incoming air, are exhausted from the power plant 10 along line 122. A blower 56 receives the oxidant reactant gas from line 126 and conveys it along line 130 to the cathode 36. A portion of the oxidant reactant gas is also directed to the reformer burner 106 (discussed hereinafter) along line 128. A further portion of the oxidant reactant gas as directed from line 128 to the auto thermal reformer 20 via line 132. It may also be preferable to increase the pressure of the oxidant reactant gas in line 132 via a compressor 58, which delivers the pressurized oxidant reactant gas along line 134 to a heat exchanger 52 (discussed hereinafter).

As mentioned above, the anode 32 requires a fuel reactant gas such as hydrogen. Although some PEM fuel cell power plants supply the anode 32 with pure hydrogen, the present power plant 10 utilizes a hydrocarbon fuel, which is converted into a hydrogen rich fuel reactant gas stream. One means for converting a hydrocarbon fuel into hydrogen rich gas includes a fuel processing system that comprises a fuel processor 20, such as an autothermal reformer, a shift converter 24, and a selective oxidizer 25. It is known that there are different types of fuel processors, which vary according to the method of providing heat to the endothermic reaction that converts hydrocarbon fuel to hydrogen. Certain hydrocarbon fuels require higher temperatures to be converted into hydrogen. For example, a catalytic steam reformer (discussed hereinafter in reference to FIG. 2) is used to, convert hydrocarbon fuels such as natural gas, propane and light naphtha into hydrogen, but cannot efficiently convert more complex hydrocarbon fuels such as gasoline and diesel fuel into hydrogen because of its limited operating temperature. An autothermal reformer, however, is entirely capable of converting heavier hydrocarbon fuels into hydrogen because it operates at a higher temperature than the catalytic steam reformer. FIG. 1 illustrates an autothermal reformer 20. Therefore the power plant 10 is capable of being fueled by a heavier hydrocarbon fuel.

The hydrocarbon fuel is introduced to the power plant 10 through a pump 12, which receives the hydrocarbon fuel along line 72 and conveys it to a de-sulfurizer 14 along line 74. Although the de-sulfurizer 14 may not be necessary, some hydrocarbon fuels include various amounts of sulfur, which may be damaging to the power plant 10. There are a variety of de-sulfurizers which are commercially available and capable of removing the undesired sulfur. It may also be preferable to elevate the temperature of the hydrocarbon fuel before it reaches the autothermal reformer 20. Therefore, after exiting the de-sulfurizer 14 along line 76, the hydrocarbon fuel passes through a heat exchanger 16, which creates a heat exchange relationship between the hydrocarbon fuel and the fuel reactant gas exiting a first oxidation bed 26 along line 98 of the selective oxidizer 25 (discussed hereinafter), thereby increasing the temperature of the hydrocarbon fuel. The heat exchangers within the power plant 10 are not required but are preferred because they increase the overall operating efficiency of the power plant 10. Therefore, as the hydrocarbon fuel exits the heat exchanger 16 along line 78, the hydrocarbon fuel enters another heat exchanger 18 which creates a heat exchange relationship between the hydrocarbon fuel and the fuel reactant gas exiting the shift converter 24 (discussed hereinafter).

The hydrocarbon fuel in line 82 combines with the steam of line 138 and the air in line 136, which collectively enter the autothermal reformer 20 through line 82. The autothermal reformer 20 converts the hydrocarbon fuel, steam and air into a fuel reactant gas, which typically consists of hydrogen, carbon dioxide and carbon monoxide. Upon exiting the autothermal reformer 20 along line 84, the fuel reactant gas enters a heat exchanger 22, which creates a heat exchange relationship between the fuel reactant gas supply and the exhaust of the anode 32, thereby decreasing the temperature of the fuel reactant gas supply. It may also be desired to further cool the fuel reactant gas along line 86 by passing it through another heat exchanger 88.

The fuel reactant gas exits the heat exchanger 88 along line 90 and enters a shift converter 24, which converts a portion of the carbon monoxide in the fuel reactant gas to carbon dioxide. The shift converter 24 operates by the chemical reaction of $CO + H_2O \rightarrow CO_2 + H_2$, thereby reducing the amount of carbon monoxide in the fuel reactant gas to about one percent (1%). There are a variety of shift converters commercially available to perform this task. As the fuel reactant gas exits the shift converter along line 92, the composition of the fuel reactant gas includes an increased portion of hydrogen and carbon dioxide and a reduced portion of carbon monoxide. The fuel reactant gas thereafter enters the heat exchanger 18 (discussed hereinbefore) which further cools the fuel reactant gas.

The fuel reactant gas thereafter enters a selective oxidizer 25 along line 94. The selective oxidizer 25 further reduces the amount of carbon monoxide in the fuel reactant gas to a predetermined low level of about ten ppmv according to the following reaction: $CO + \frac{1}{2}O_2 \rightarrow CO_2$. Although it is not necessary, it is preferable to use a selective oxidizer 25 that includes two oxidation stages 26, 28 such as illustrated in U.S. Pat. No. 5,330,727, which is hereby incorporated by reference. If a single stage selective oxidizer is capable of reducing the concentration of carbon monoxide in the fuel reactant gas to less than about ten ppmv, then only one oxidation stage is required. If, however, the selective oxidizer 25 does not reduce the level of carbon monoxide in the fuel reactant gas to the predetermined low level of about ten ppmv of CO, then an additional oxidizer stage may be added to the power plant 10. This additional stage may be a separate selective oxidizer or an additional oxidizer bed 28 receiving fuel reactant gas along line 99 as explained in U.S. Pat. No. 5,330,727. This composition of fuel reactant gas enters the anode 32 along line 100 and exits along line 102 as anode exhaust, which passes through the heat exchanger 22 (discussed hereinbefore).

The anode exhaust contains unused fuel reactant gas, which exits heat exchanger 22 along line 104 and is used to fuel a reformer burner 106. Although it is not shown, the reformer burner 106 may also receive hydrocarbon fuel directly, thereby furnishing the reformer burner 106 with a source of fuel during start-up and other periods when the anode exhaust fails to provide a sufficient supply of fuel. The burner exhaust travels along line 108 to a heat exchanger 50, which creates a heat exchange relationship between the burner exhaust and the steam in line 142, thereby increasing the temperature of the steam. A portion of the burner exhaust also travels along line 110 to another heat exchanger 52, which creates a heat exchange relationship between the burner exhaust and the air in line 134, thereby increasing the temperature of the air supplied to the autothermal reformer 20. After passing through the heat exchangers 50, 52, the burner exhaust travels along lines 116 and 114, respectively to a heat exchanger 60, which reduces the temperature of the burner exhaust. The burner exhaust thereafter travels along line 118, combines with the cathode exhaust of line 144 and enters another heat exchanger 62, which further reduces the temperature of the combined exhaust before it enters the water transfer device 54 (discussed hearin before).

Figure 2:
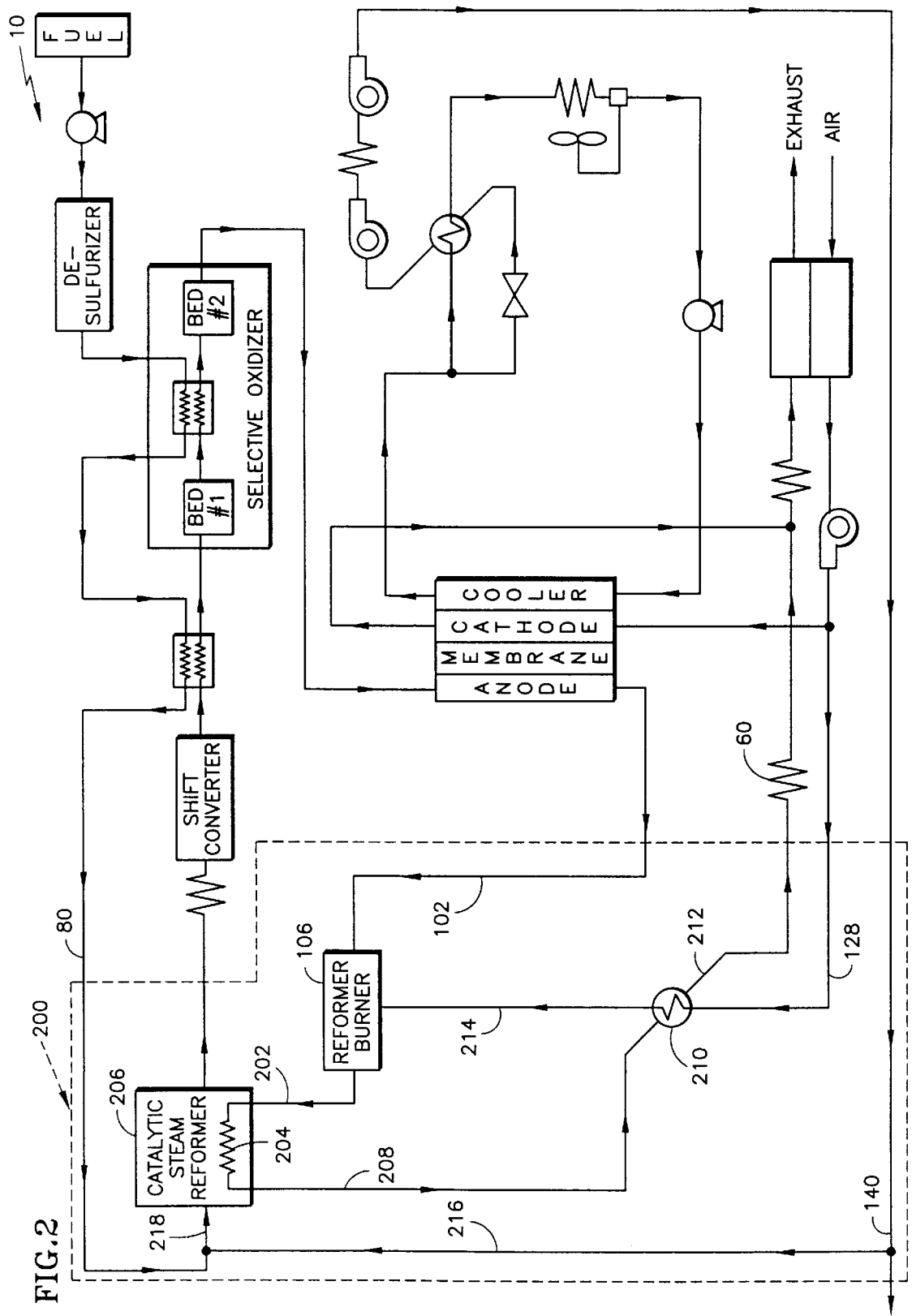
FIG. 2 is a schematic diagram of a power plant, which includes a coolant stream that circulates through a PEM fuel cell and produces steam for use by a catalytic steam reformer.

Referring to FIG. 2, there is shown an alternate embodiment of the present invention. Specifically, the FIG. 2 embodiment differs from the FIG. 1 embodiment in that the area designated by numeral 200 in FIG. 2 includes a catalytic steam reformer 206 rather than the autothermal reformer 20 illustrated in FIG. 1.

Continuing to refer to FIG. 2, the hydrocarbon fuel in line 80 and the steam in line 216 are combined in line 218 and collectively enter the catalytic steam reformer 206. Unlike an autothermal reformer, wherein the burning of the hydrocarbon fuel within the autothermal reformer creates the heat required to extract the hydrogen from the hydrocarbon fuel, a catalytic steam is indirectly heated. One means of indirectly heating the catalytic steam reformer 206 includes placing a heat exchanger 204 within the catalytic steam reformer 206. The heat exchanger 204 transfers heat from the burner exhaust in line 202 to the catalytic steam reformer 206. After exiting the heat exchanger 204 along line 208, the burner exhaust enters a different heat exchanger 210, which creates a heat exchange relationship between the burner exhaust and the air in line 128, thereby heating the air supplied to the reformer burner 106 in line 214. The burner exhaust exiting the heat exchanger 210 along line 212, thereafter enters the heat exchanger 60 (discussed hereinbefore).

Figure 3:
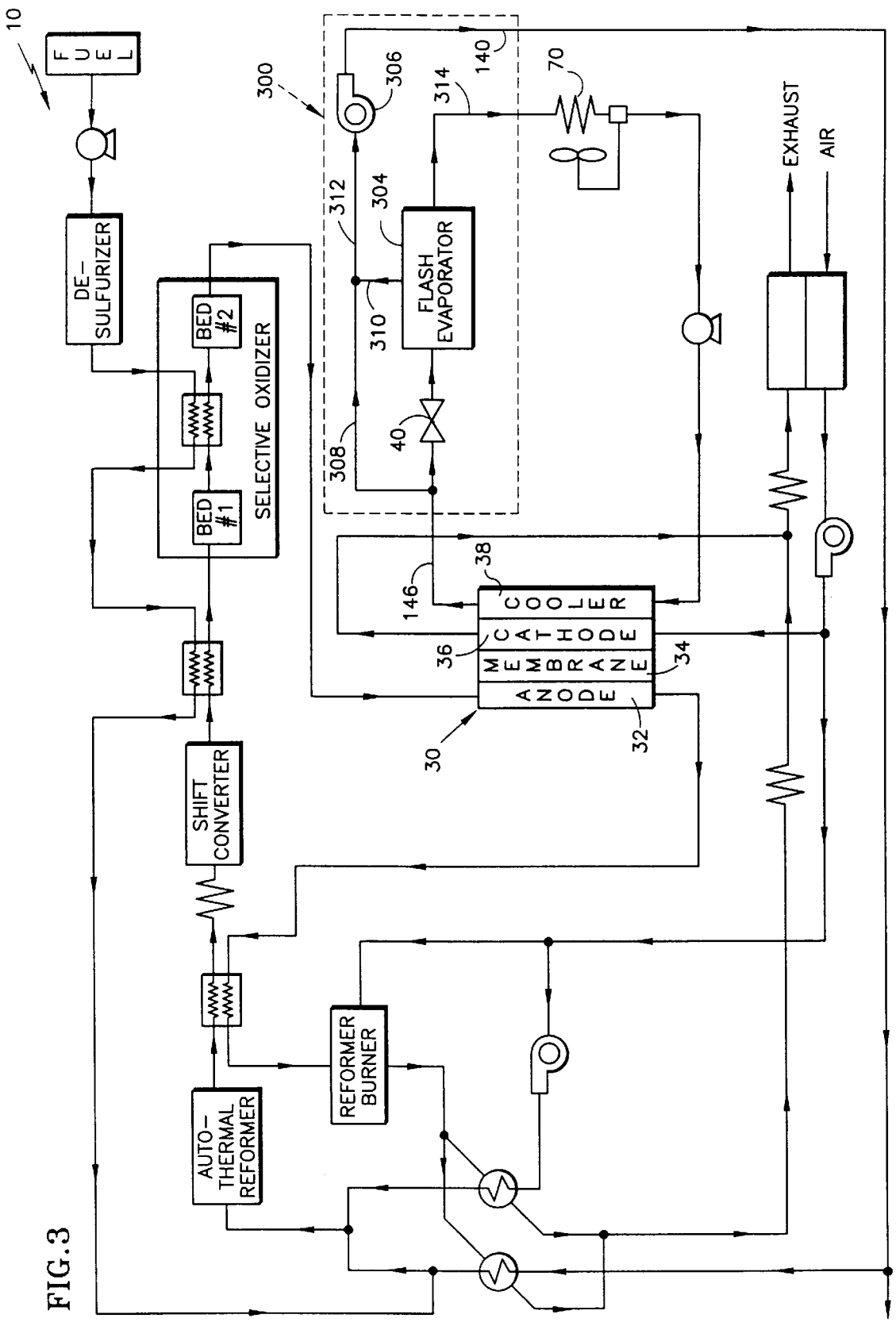
FIG. 3 is an alternate embodiment of the present invention illustrating an alternate means for producing steam from the coolant stream.

Referring to FIG. 3, there is shown a further alternate embodiment of the present invention. Specifically, the FIG. 3 embodiment differs from the FIG. 1 embodiment in that the area designated by numeral 300 in FIG. 3 includes an alternate means for producing steam from the coolant stream. Continuing to refer to FIG. 3, the coolant fluid exiting the fuel cell 80 along line 146 enters a valve 40 before entering the flash evaporator 304. The valve 40 reduces the pressure of the coolant fluid to its saturation level such that a portion of the coolant fluid entering the flash evaporator 304 transforms to steam. The steam exits the flash evaporator 304 along line 310, and any coolant fluid, that did not transform to steam exits the flash evaporator along line 314 and enters the heat exchanger 70. As discussed above, a compressor's exposure to high temperature steam exiting the compressor may cause the materials within the compressor to degrade. Therefore, it is preferable to reduce the temperature of the steam entering the compressor 306 along line 312 so as to extend the useful life of the compressor 306. One such means of accomplishing that result includes extracting a portion of coolant fluid from line 146 via line 308. The coolant fluid in line 308 combines with the steam in line 310 and simultaneously enter the compressor 306 along line 312. The liquid water evaporates and cools the compressor, thereby reducing the temperature of the steam exiting the compressor 306 and allowing the use of only one compressor. For example, as about 6723 lbs/hr of coolant fluid exits the cooler 38 along line 146, about 6715 lbs/hr of such coolant fluid passes through the valve 40 and enters the flash evaporator 304. About 68 lbs/hr of 170° F. steam having a pressure of 5.95 psia exits the flash evaporator 304 along line 310, while 6647 lbs/hr of 170° F. coolant fluid having a pressure of 5.95 psia exits the flash evaporator 304 along line 314. The coolant fluid in line 308 containing about 7.35 lbs/hr and having a temperature and pressure of 180° F. and 14.7 psia, respectively, is combined with the steam in line 310 and delivered to the compressor 306 simultaneously along line 312. The compressor 306 emits about 75 lbs/hr of 300° F. steam having a pressure of about 17.66 psia. When powering the compressor 306 with 5.28 kW electric motor, the power plant 10 produces about 4.2 Btu of steam for every Btu required to power the compressor, thereby producing a useful supply of process and cogenerated steam.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A fuel cell power plant, comprising:
   (a) a cell stack assembly of fuel cells, each fuel cell comprising a cathode, an anode and a proton exchange membrane disposed between said cathode and said anode;
   (b) means for circulating a coolant stream through said cell stack, thereby cooling said cell stack assembly;
   (c) means for creating steam from the coolant stream, comprising:
      (1) an evaporator;
      (2) means for creating a secondary coolant stream from the coolant stream;
      (3) means for reducing the pressure of the secondary coolant stream such that the secondary coolant stream changes to steam in said evaporator; and
      (4) a compressor for increasing the pressure of the steam exiting said evaporator;
   (d) means for providing a fuel reactant gas to said anode, said means for providing a fuel reactant gas
      (1) a fuel processor for receiving the hydrocarbon fuel and the steam, said fuel processor producing a fuel reactant gas comprising hydrogen and carbon monoxide;
      (2) a shift converter for receiving the fuel reactant gas from said fuel processor and converting a portion of the carbon monoxide in the fuel reactant gas to carbon dioxide;
      (3) a selective oxidizer for receiving the fuel reactant gas from said shift converter and converting a further portion of the carbon monoxide in the fuel reactant gas to carbon dioxide; and
   (e) means for providing an oxidant reactant gas to said cathode.

2. The fuel cell power plant of claim 1 wherein said means for reducing the pressure of the secondary coolant stream comprises a valve.

3. The fuel cell power plant of claim 2 wherein said valve is an expansion valve.

4. The fuel cell power plant of claim 1 wherein said evaporator creates a heat exchange relationship between the coolant stream and the secondary coolant stream.

5. The fuel cell power plant of claim 1 further comprising a second compressor for further increasing the pressure of the steam exiting said compressor.

6. The fuel cell power plant of claim 1 wherein said compressor receives the remaining portion of the coolant stream, which cools said compressor.

7. The fuel cell power plant of claim 1 wherein said selective oxidizer includes one oxidizer stage.

8. The fuel cell power plant of claim 1 wherein selective oxidizer includes at least two oxidizer stages.

9. The fuel cell power plant of claim 1 wherein said fuel processor is a reformer.

10. The fuel cell power plant of claim 9 wherein said reformer is an autothermal reformer.

11. The fuel cell power plant of claim 9 wherein said reformer is a catalytic steam reformer.

12. The fuel cell power plant of claim 9 further comprising a first heat exchanger and a second heat exchanger and a reformer burner, said first heat exchanger creating a heat exchange relationship between the exhaust of said reformer burner and the steam, said second heat exchanger creating a heat exchange relationship between the exhaust of said reformer burner and the oxidant gas.

13. The fuel cell power plant of claim 1 wherein said means for providing an oxidant gas includes a water transfer device for transferring water vapor in the power plant exhaust stream to the oxidant reactant gas.

14. The fuel cell power plant of claim 13 wherein said water transfer device is selected from the group consisting of a condenser, a contact condenser, a contact saturator, and an enthalpy wheel.

15. The fuel cell power plant of claim 1 wherein said means for circulating coolant stream through said cell stack assembly comprises:
   (a) a cooler disposed adjacent to said cathode and transferring heat produced in the cell stack assembly to a coolant stream passing through said cooler;
   (b) a pump;
   (c) a heat exchanger for removing heat from the coolant stream; and
   (d) a controller for controlling the temperature of the coolant stream.

16. A method for operating a fuel cell power plant, said power plant having a cell stack assembly of fuel cells, each fuel cell having a cathode, an anode and a proton exchange membrane disposed between said cathode and anodes, said method comprising the steps of:
   (a) providing an oxidant reactant gas to said cathode;
   (b) supplying a stream of coolant fluid to the cell stack assembly;
   (c) creating a secondary stream of coolant fluid from the stream of coolant fluid exiting the cell stack assembly;
   (d) reducing the pressure of the secondary stream of coolant fluid such that the secondary stream transforms to steam;
   (e) increasing the pressure of the steam;
   (f) supplying the steam and a hydrocarbon fuel to a fuel processor for producing a fuel reactant gas comprising hydrogen and carbon monoxide;
   (g) supplying the fuel reactant gas exiting the fuel processor to a shift converter for converting a portion of the carbon monoxide in the fuel reactant gas to carbon dioxide;
   (h) supplying the fuel reactant gas exiting the shift converter to a selective oxidizer for further converting the carbon monoxide in the fuel reactant gas to carbon dioxide; and
   (i) conveying the fuel reactant gas from the selective oxidizer to the anode.

17. The method of claim 16 further comprising the step of creating a heat exchange relationship between the secondary stream of coolant fluid and stream of coolant fluid exiting the cell stack assembly.

18. The method of claim 16 further comprising the step of further increasing the pressure of the steam.

19. The method of claim 16 further comprising the step of reducing the temperature of the steam by mixing a portion of the coolant fluid stream with the steam.

20. The method of claim 16 further comprising the step of transferring water vapor that is present in the power plant exhaust to the oxidant reactant gas.

* * * * *